(12) United States Patent
Haglund

(10) Patent No.: US 7,766,424 B2
(45) Date of Patent: Aug. 3, 2010

(54) RECLINER MECHANISM

(75) Inventor: Lennart Haglund, Vårgårda (SE)

(73) Assignee: Autoliv Development AB, Vargarda (SE)

( * ) Notice: Subject to any disclaimer, the term of this patent is extended or adjusted under 35 U.S.C. 154(b) by 517 days.

(21) Appl. No.: 11/664,405

(22) PCT Filed: Sep. 28, 2005

(86) PCT No.: PCT/SE2005/001422

§ 371 (c)(1), (2), (4) Date: Mar. 30, 2007

(87) PCT Pub. No.: WO2006/041375

PCT Pub. Date: Apr. 20, 2006

(65) Prior Publication Data

US 2009/0001786 A1 Jan. 1, 2009

(30) Foreign Application Priority Data

Oct. 11, 2004 (GB) .................. 0422565.2

(51) Int. Cl.
*B60N 2/42* (2006.01)
(52) U.S. Cl. .............. 297/216.13; 297/216.1; 297/216.12; 297/216.14; 297/409
(58) Field of Classification Search . 297/216.1–216.14, 297/408, 409
See application file for complete search history.

(56) References Cited

U.S. PATENT DOCUMENTS

| 5,219,202 | A | * | 6/1993 | Rink et al. | ............. 297/216.13 |
| 5,318,341 | A | * | 6/1994 | Griswold et al. | ........ 297/362.11 |
| 5,597,205 | A | * | 1/1997 | Glance et al. | .......... 297/362.14 |
| 6,024,406 | A | * | 2/2000 | Charras et al. | ......... 297/216.14 |
| 6,164,720 | A |   | 12/2000 | Haglund | |
| 6,296,306 | B1 | * | 10/2001 | Specht et al. | .......... 297/216.14 |
| 6,340,206 | B1 |   | 1/2002 | Andersson et al. | |
| 6,478,256 | B1 | * | 11/2002 | Williamson | ............. 244/122 R |
| 6,709,053 | B1 | * | 3/2004 | Humer et al. | ............. 297/216.1 |
| 2004/0113480 | A1 | * | 6/2004 | Reed et al. | .................. 297/408 |

FOREIGN PATENT DOCUMENTS

WO 00/26057 A1 5/2000

* cited by examiner

*Primary Examiner*—Laurie K Cranmer
(74) *Attorney, Agent, or Firm*—Harness, Dickey & Pierce, P.L.C.

(57) ABSTRACT

A recliner mechanism for a vehicle seat includes a support plate (7) mounted on the squab (2) of the seat, and a support plate (11) mounted on the back rest (3) of the seat. There is a pivotal interconnection (10) between the plates to enable the back rest to be reclined. The pivotal interconnection is initially retained by a spring (20), in a retaining part (15) of an elongate slot (14). When the back rest (3) is subjected to a rearward force, such as by a seat occupant in a rear impact situation, the spring is deformed and the pivot shaft moves along the slot (14), enabling the back rest (3) to move rearwardly. An energy absorbing element (17) is provided which deforms, whilst absorbing energy, during this second movement of the back rest.

20 Claims, 12 Drawing Sheets

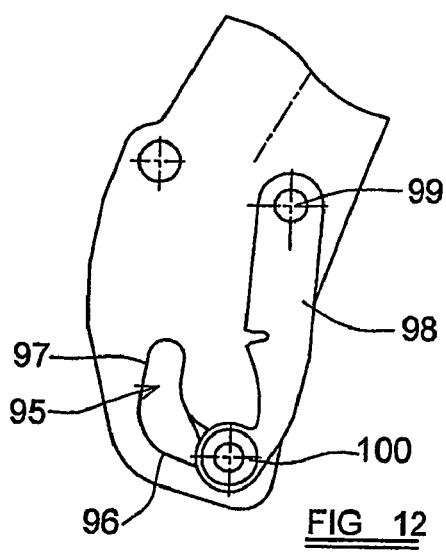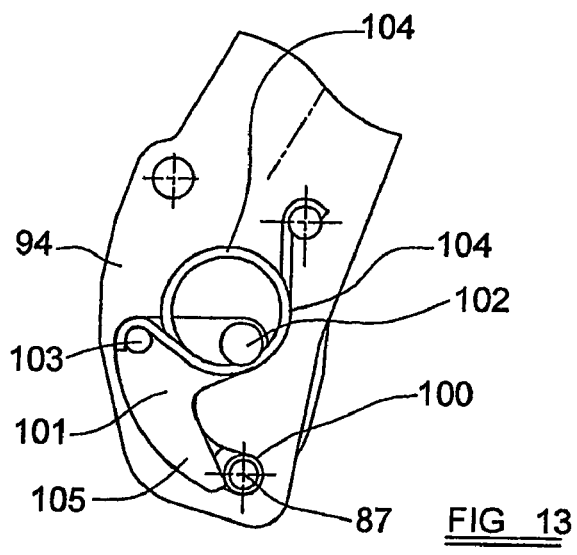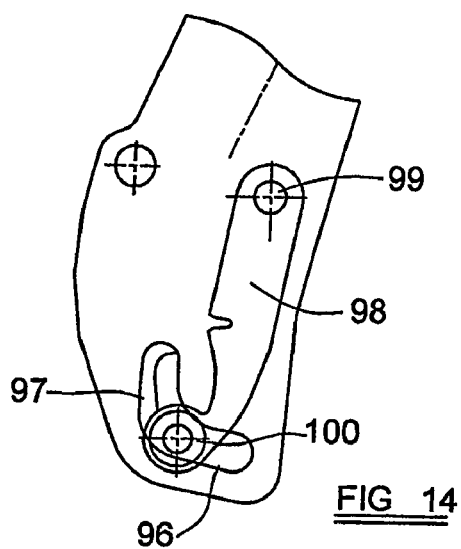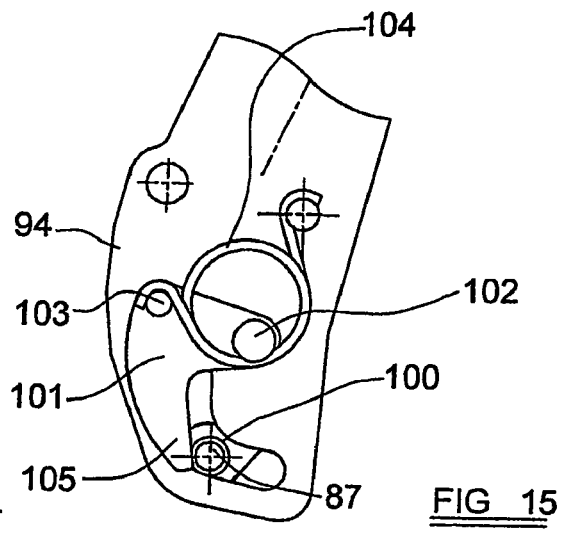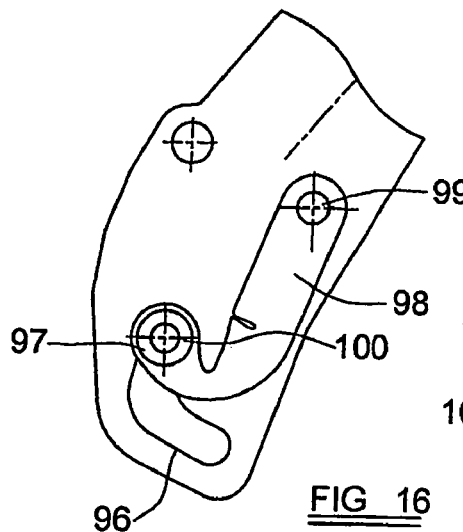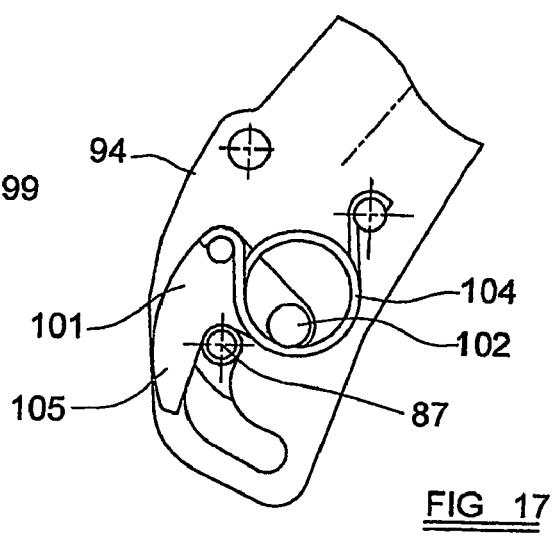

RECLINER MECHANISM

Figure 1:
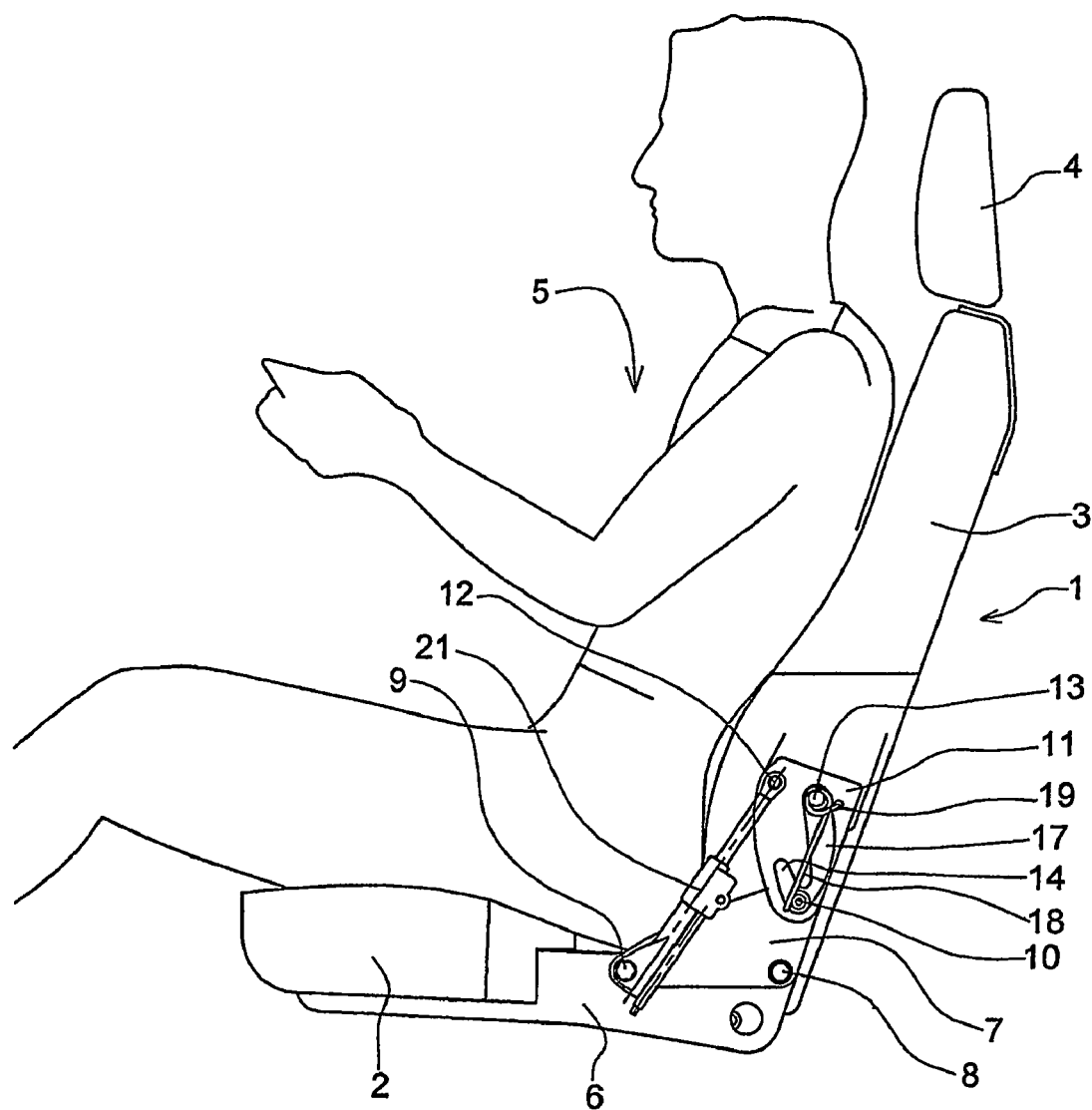

The present invention relates to a recliner mechanism, and more particularly relates to a recliner mechanism for use on a vehicle seat.

A typical vehicle seat comprises a squab and a back-rest, and the back-rest may carry a head-rest.

It is desirable for the user of a seat to be able to adjust the angle of inclination of the back-rest relative to the squab, so that the seat may be comfortable for the seat occupant. It has therefore been proposed previously to provide a recliner mechanism, to be operatively connected between the squab of the seat and the back-rest of the seat, which may be operated to provide the required adjustment of the angle of the back-rest of the seat.

It is known that substantial injuries can be imparted to a seat occupant during a so-called "rear impact". In a rear impact the vehicle in which the occupant is travelling is stationary or is travelling very slowly, and the vehicle is hit, from the rear, by a more rapidly moving vehicle. In such a situation, the buttocks and torso of the seat occupant, which are generally in firm contact with the seat or the back-rest, may be given a very rapid acceleration. In such a situation the head of the occupant, which is typically not in contact with any part of the seat, may be given, during the first few moments of the rear impact, no acceleration at all. Consequently the buttocks and torso of the seat occupant may move forwardly, whilst, effectively, due to inertia, the head remains stationary. This causes the neck of the seat occupant to bend, until the head makes contact with the head-rest, or until the neck itself applies a forward force to the head of the occupant, which may initially tend to rotate the head about a horizontal axis, and then "flick" the head forwardly. Such a movement of the neck and head can cause injuries, which are known as "whiplash" injuries.

It has been proposed previously to provide a vehicle seat with a back-rest which will "yield", in the event of a rear impact, in response to the rearward force applied to the seat-back as a consequence of the inertia of the torso of the seat occupant. Seat-backs of this type have been found to reduce or minimize "whiplash" injuries as, in a rear impact, with a seat of this type, the torso of the seat occupant does not move very far relative to the head of the seat occupant, and thus no substantial stress is applied to the neck.

In prior proposed arrangements the mechanisms utilised have either been expensive to manufacture or have possessed an undesirable degree of "play" or "tolerance" which does not provide the vehicle seat with the desired sense of firmness and security.

The present invention seeks to provide an improved recliner mechanism and an improved vehicle seat incorporating a recliner mechanism.

According to this invention there is provided a recliner mechanism for a vehicle seat, the recliner mechanism incorporating a support plate to be formed by part of or to be mounted on the frame of the squab of the seat, and a mounting plate formed by part of or to be mounted on the back-rest of the seat, there being a pivotal interconnection between the plates to enable the mounting plate to move with a pivotal action relative to the support plate to enable the back-rest of the seat to be reclined, relative to the squab, there being a drive mechanism operable to effect reclining of the back-rest of the seat, one of said plates defining a slot receiving a shaft which is fast with the other plate, the slot defining two sections in the form of an initial retaining section and a second elongate section, the slot being dimensioned to permit movement of the shaft along the slot, there being a resilient or frangible element to retain the components of the recliner in such a position that the shaft is retained within the initial retaining section of the slot to prevent relative movement between the plates, the resilient or frangible element being deformable when subjected to a predetermined force to permit the shaft to move from the initial retaining section of the slot to the elongate section, to enable the shaft subsequently to move along the elongate section, to permit relative movement between the plates, with the back-rest moving rearwardly relative to the squab, there being an energy absorbing element to absorb energy as the shaft moves along the elongate section of the slot.

It is envisaged that the resilient or frangible element will be deformed when subjected to a predetermined rearwardly directed force applied to the lower part of the back-rest of a seat in which the recliner mechanism is incorporated. Such a force may typically be expected to be applied to the back-rest of the seat in a rear impact situation when the buttocks and lower torso of the seat occupant, due to inertia, apply the force to the back-rest. If, in an accident situation of the rear impact type, the force applied to the lower part of the back-rest of the seat is sufficient to deform the resilient or frangible element sufficiently to enable the shaft to move from the initial retaining section of the slot to the elongate section of the slot, the back-rest of the seat will move rearwardly, relative to the squab, and energy will be absorbed by the energy absorbing element.

Preferably the resilient or frangible element absorbs a predetermined amount of energy when subjected to the predetermined force to permit the shaft to move from the initial retaining section of the slot to the elongate section, the energy absorbing element being configured to absorb a substantially greater amount of energy during the subsequent rearward movement of the back-rest.

Conveniently the energy absorbing element is in the form of a deformable arm.

Preferably the energy absorbing element is provided with a tubular casing extending through said slot, the shaft which is received in the slot being accommodated within the tubular casing In one embodiment of the invention the support plate is fast with the squab of the seat and the mounting plate is fast with the back-rest of the seat, the support plate carrying a main pivot shaft, the pivot shaft extending through the said slot which is formed in the mounting plate, the pivot shaft defining an axis of pivotal movement of the mounting plate relative to the support plate about which the back-rest of the seat to be reclined.

Preferably the energy absorbing element is connected to the mounting plate and also connected to the main pivot shaft.

Conveniently the resilient or frangible element is in the form of a spring, the spring operating to bias the main pivot shaft into the initial retaining section of the slot.

Advantageously the spring acts directly on the said main pivot shaft.

Alternatively the spring acts on the pivot shaft through the intermediary of a pivotally mounted keeper.

Advantageously the drive mechanism is operable to increase or decrease the distance between a point on the support plate and a fixing on the mounting plate.

In an alternative embodiment of the invention the mounting plate is fast with the frame of the back-rest of the seat and the support plate is mounted to the frame of the squab of the seat, for movement relative to the seat squab frame, the support plate being mounted by engagement with the main pivot shaft, which is carried by the squab of the seat, and by the drive mechanism, which drive mechanism is secured to the frame of the squab of the seat, the said slot being formed in the support plate, a retaining shaft which is fast with the mounting plate extending through the slot, the energy absorbing element engaging the main pivot shaft and the retaining shaft, the support plate and the mounting plate being pivotally interconnected by a pivot linkage, the main pivot shaft defining the axis of pivotal movement of the combination of the mounting plate and the support plate as the back-rest of the seat is reclined.

Conveniently the resilient or frangible element is in the form of a spring, the spring engaging the support plate and the mounting plate and biasing the support plate and the mounting plate to a position in which the retaining shaft is located in the initial retaining section of the slot.

Advantageously the recliner mechanism may be associated with a head-rest moving mechanism to move the head-rest of the seat in response to a movement of the mounting plate relative to the support plate sufficient to cause deformation of the resilient or frangible element, or sufficient to cause the energy absorbing element to absorb energy.

Conveniently a link arm is provided to link the recliner mechanism with the head-rest, the link arm being connected to a main pivot shaft. In an alternative embodiment a link arm is provided to connect to the recliner mechanism with the head-rest, the link arm being connected to the keeper element.

Conveniently the seat is provided with two recliner mechanisms, one on each side of the seat, which mechanism being connected to a respective link arm, movement of the link arms causing movement of head-rest supports to cause the head-rest to move forwardly.

Preferably the head-rest supports are arcuate and extend through arcuate guides in a guide block so that axial movement of the supports causes the head-rest to move upwardly and forwardly relative to the back-rest of the seat.

Figure 2:
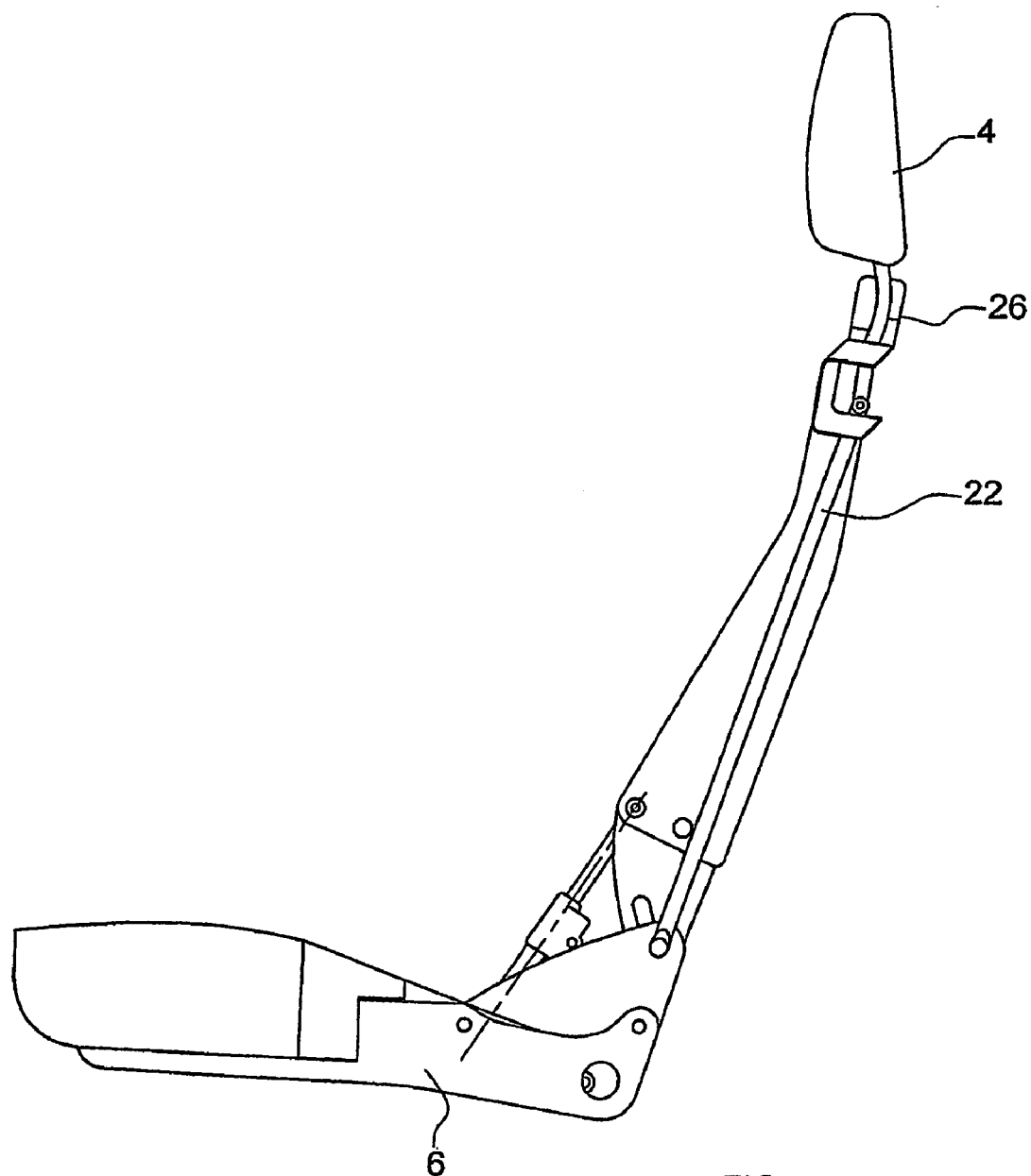
Figure 3:
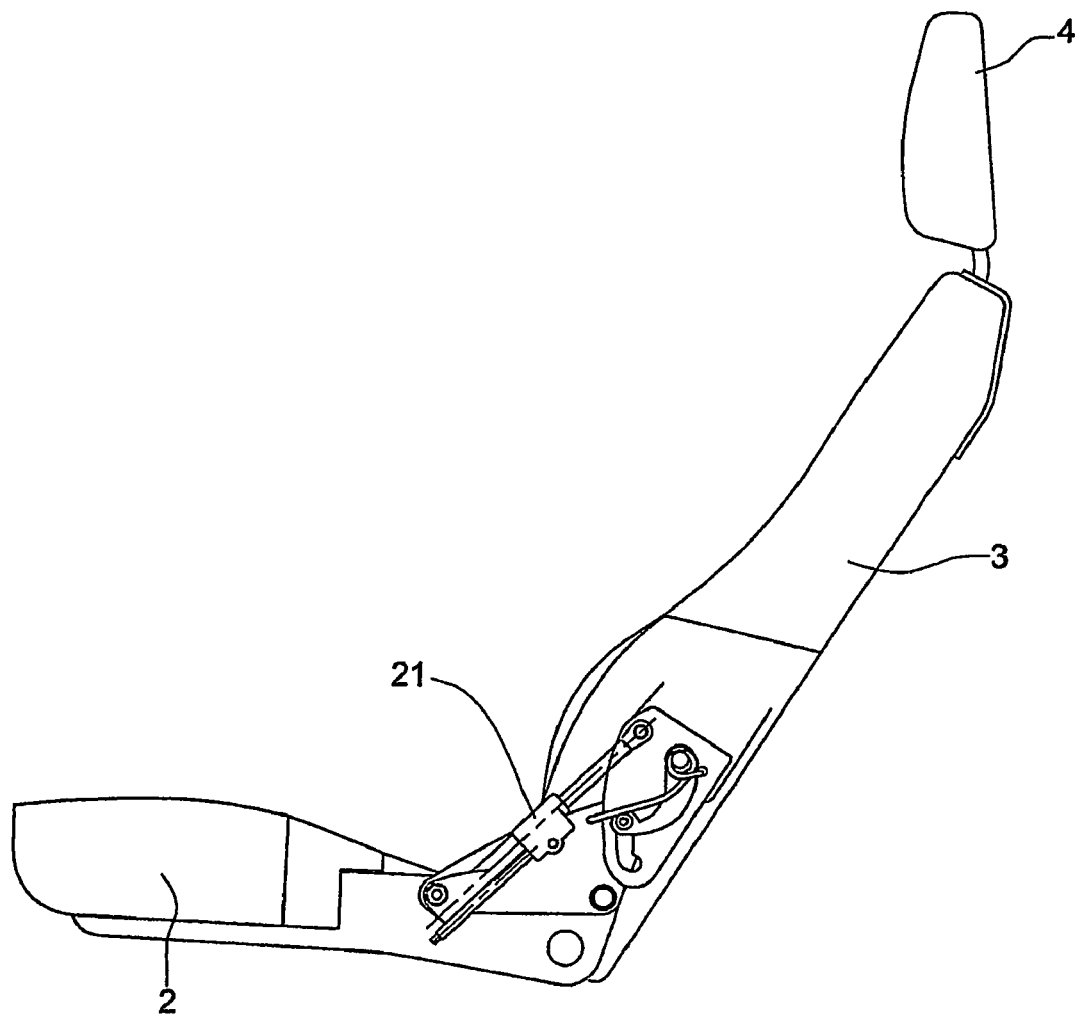
Figure 4:
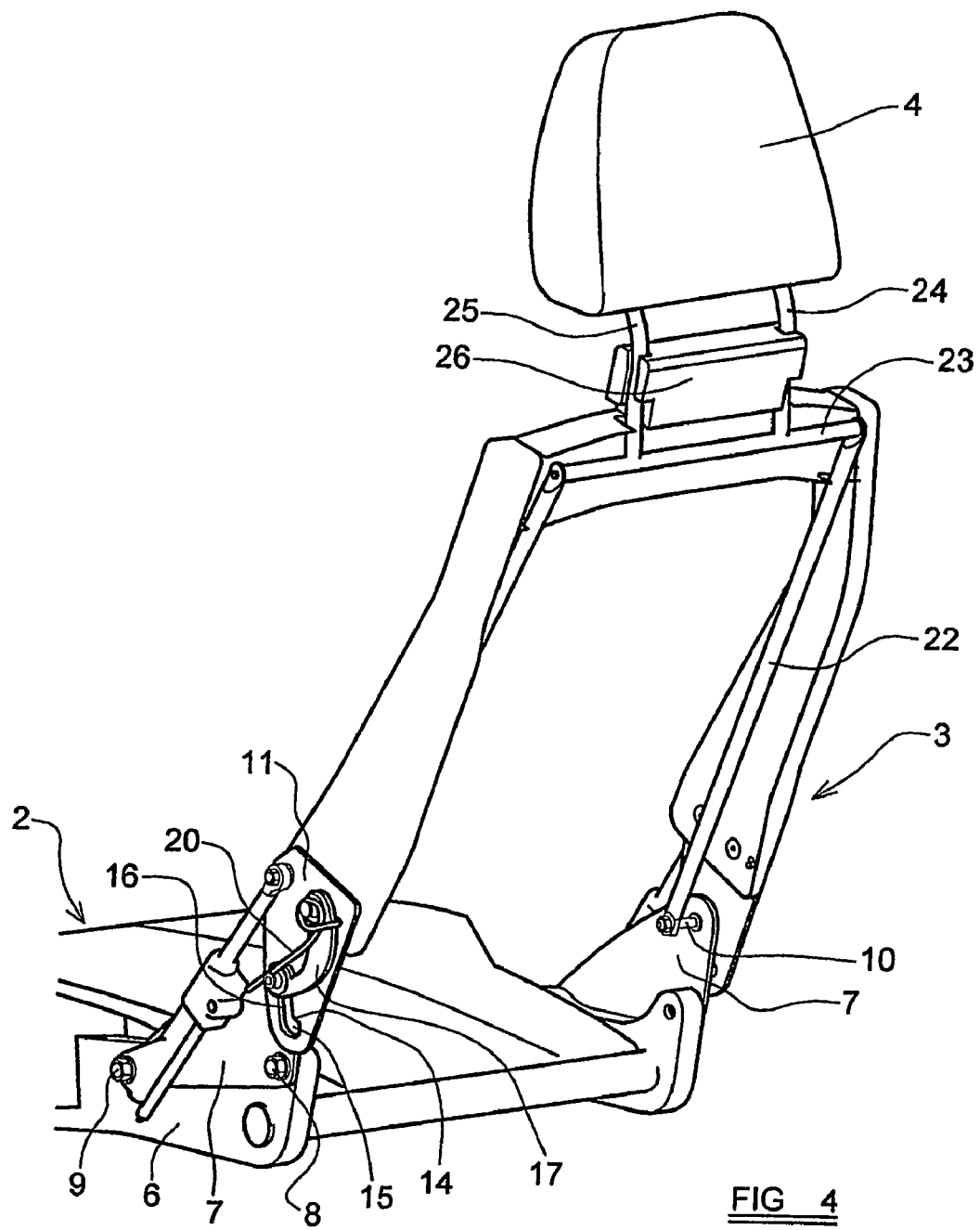
Figure 5:
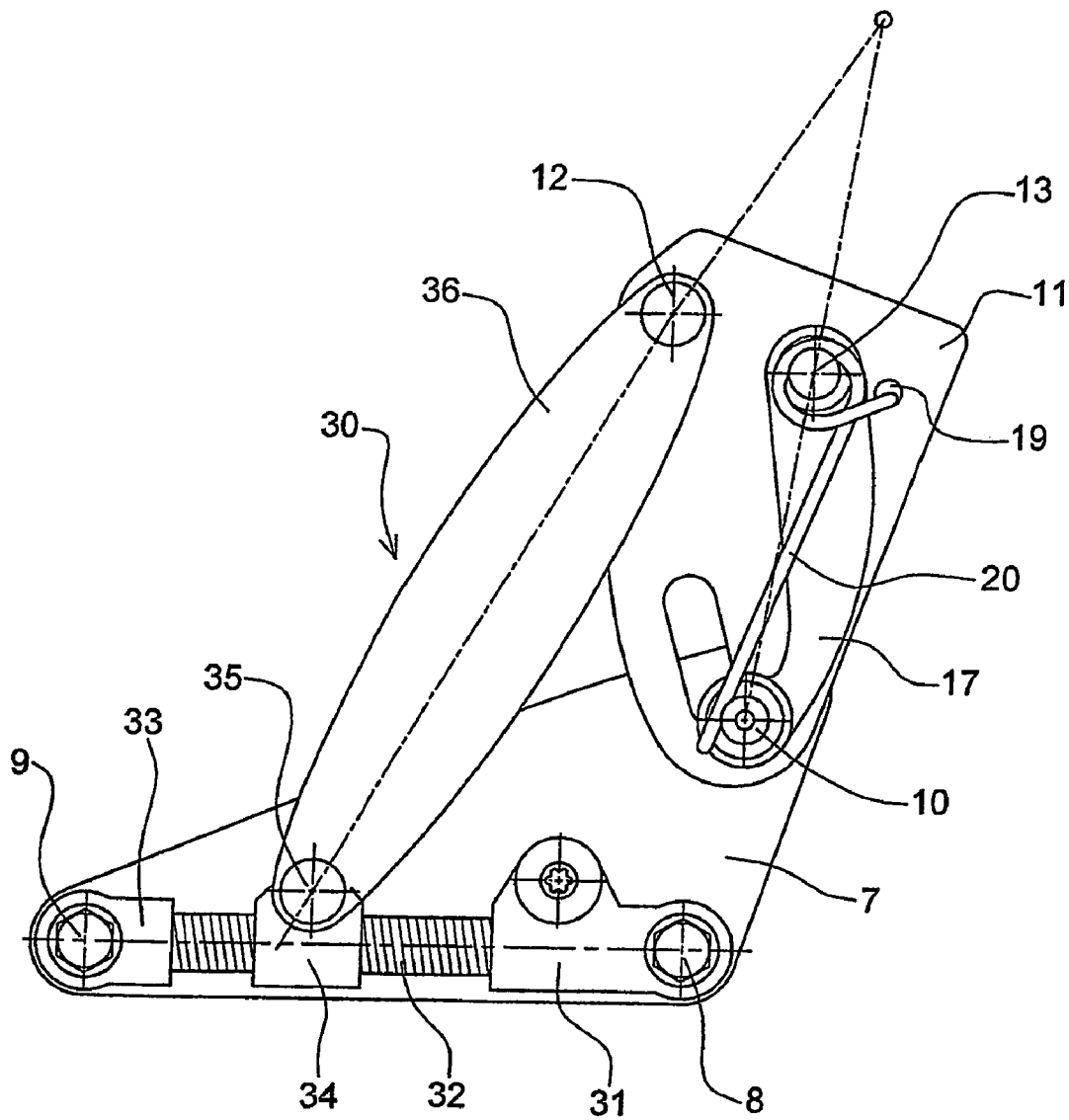
Figure 6:
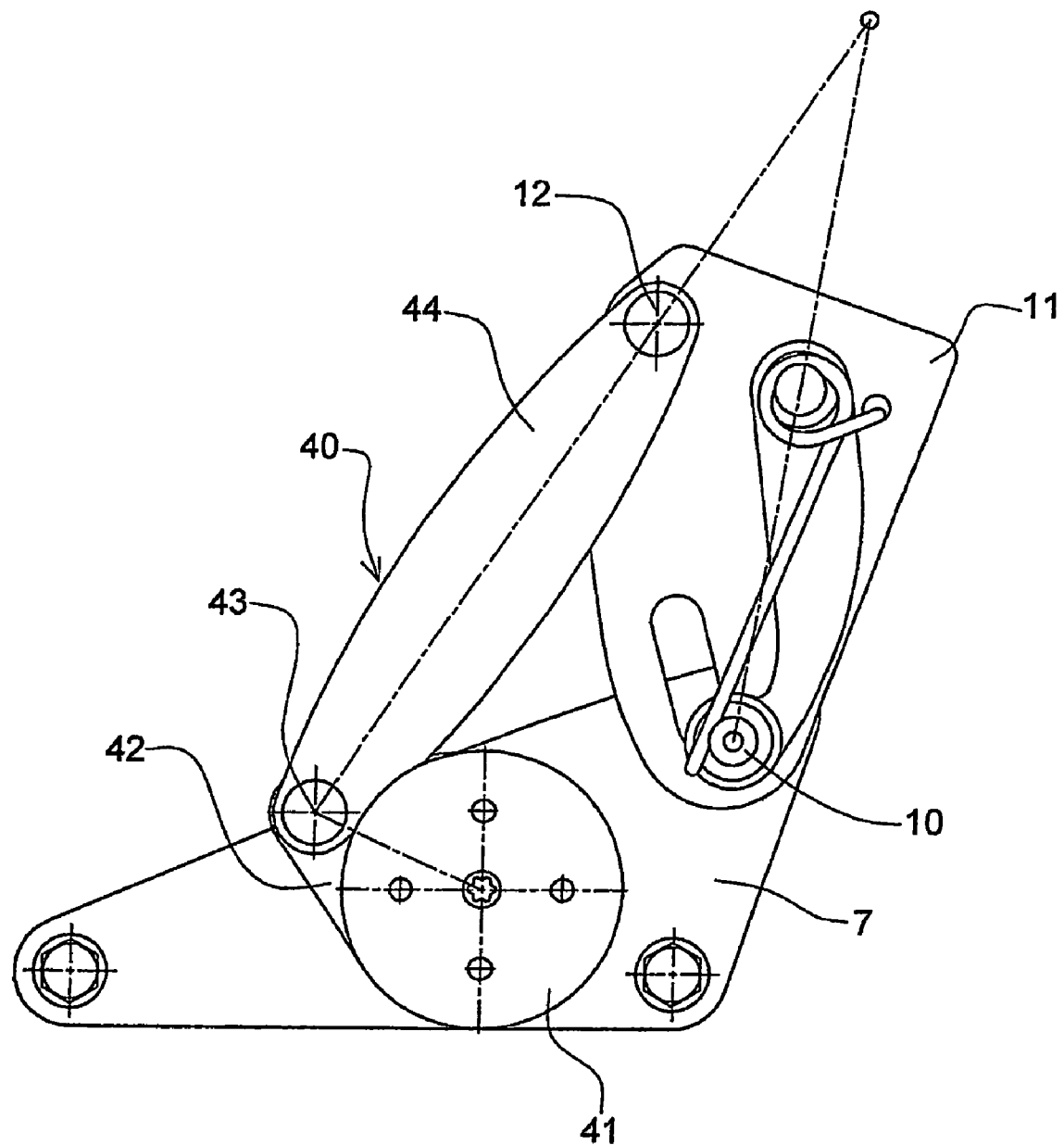
Figure 7:
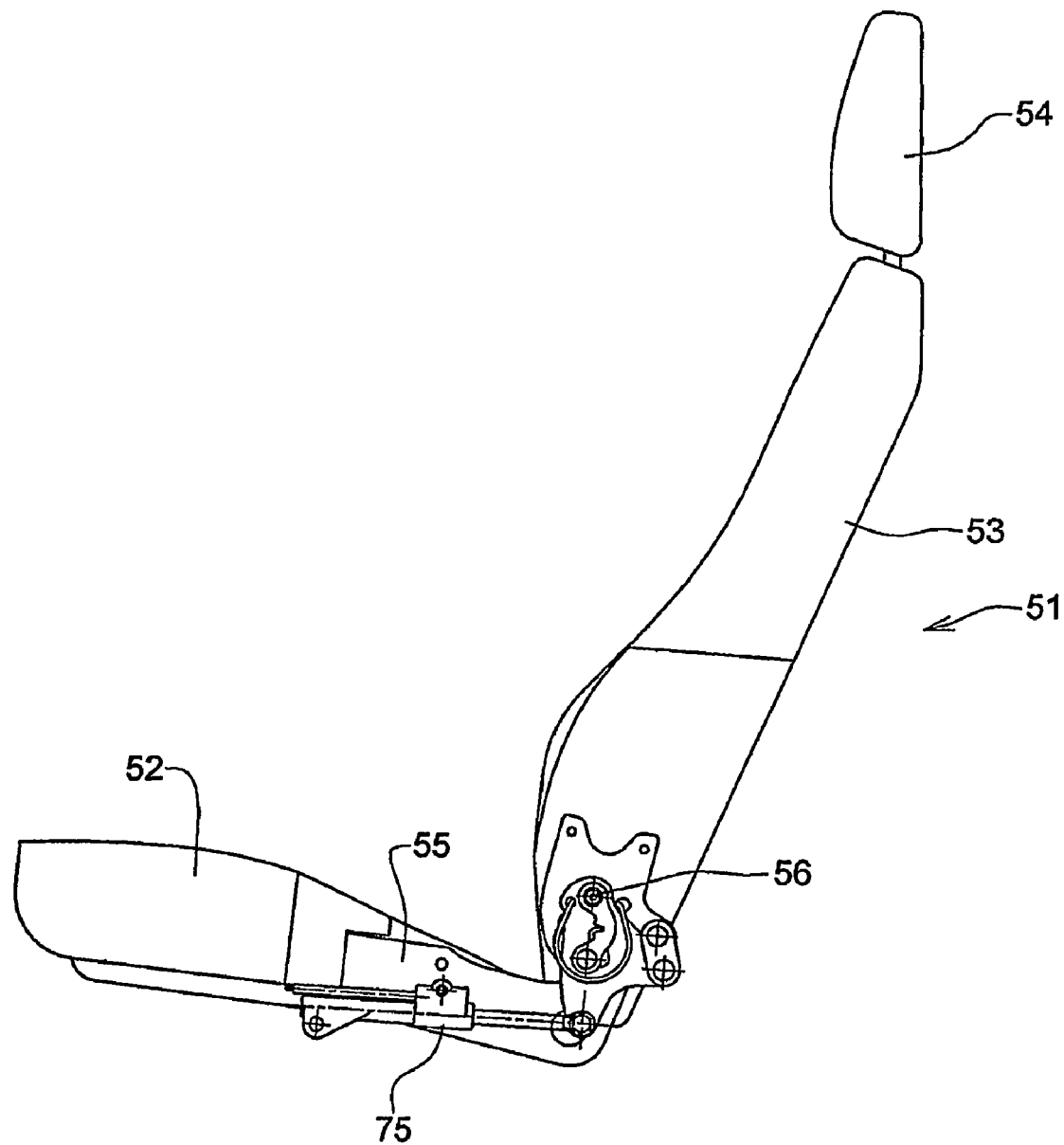
Figure 8:
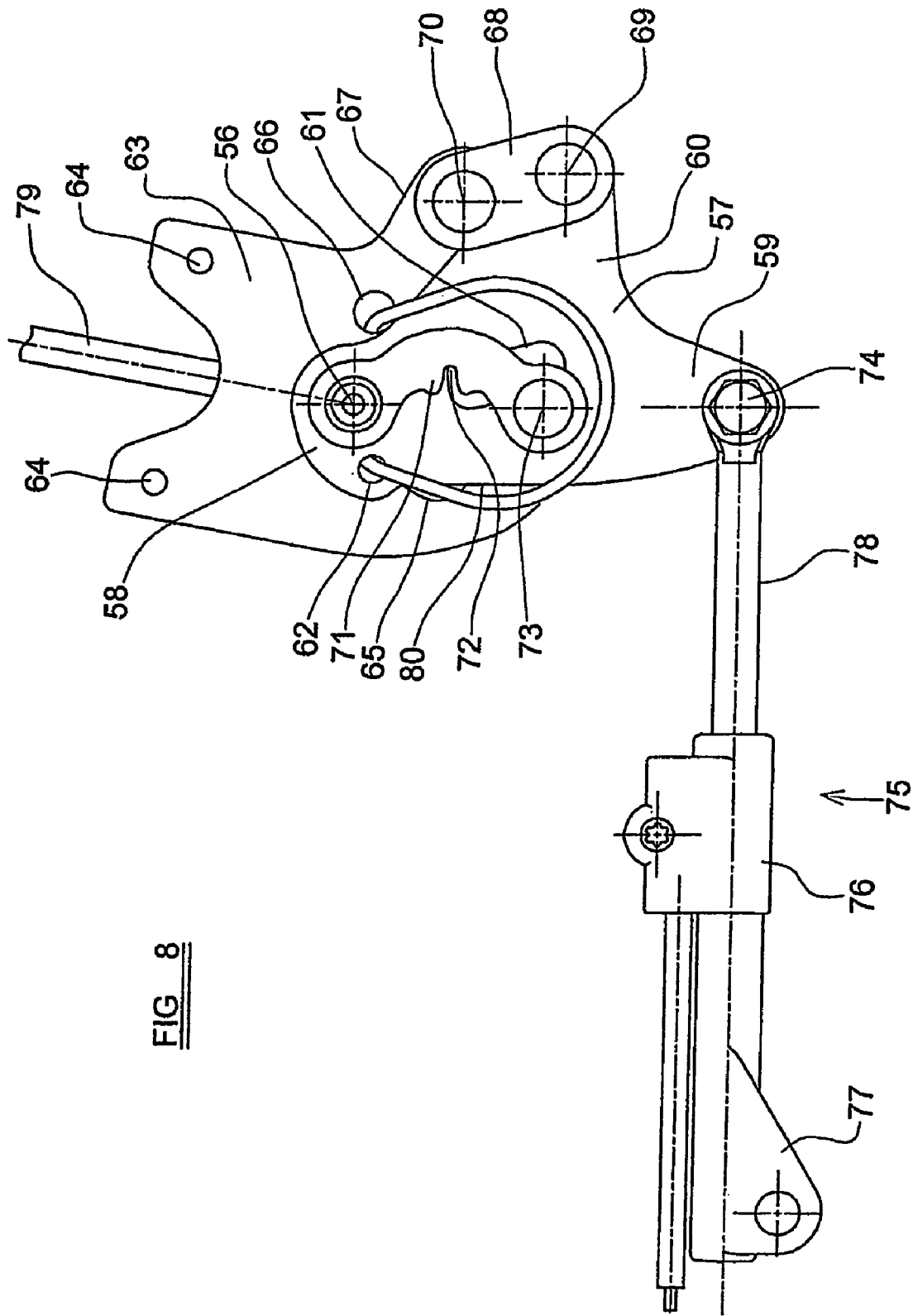
Figure 9:
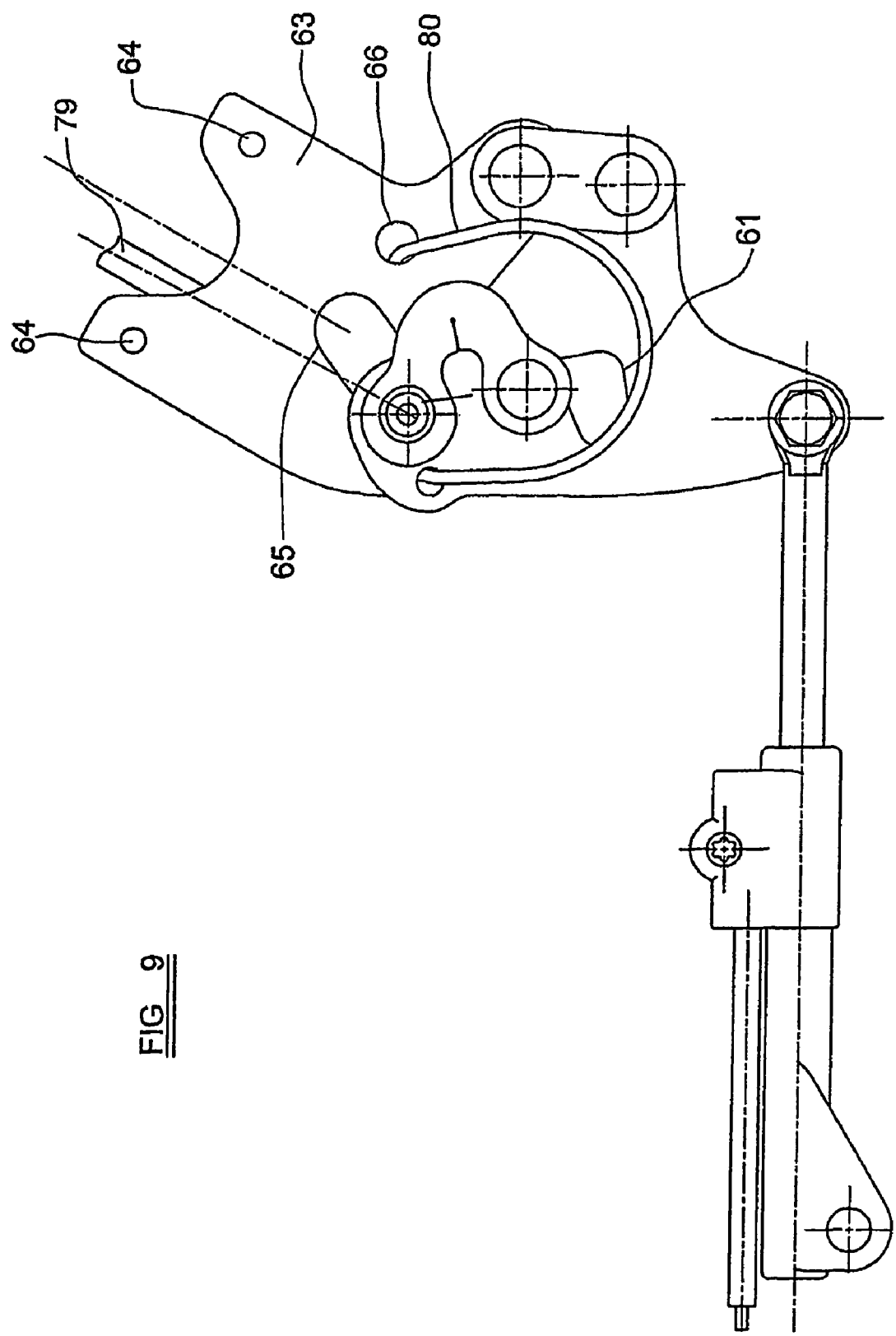

In order that the invention may be more readily understood, and so that further features thereof may be appreciated, the invention will now be described, by way of example, with reference to the accompanying drawings in which:

FIG. 1 is a side view of a vehicle seat illustrating a recliner mechanism in accordance with the invention, FIG. 2 is a part-sectional view of the seat of FIG. 1 illustrating a connection between the recliner mechanism and a head-rest mounted on the seat, FIG. 3 is a view corresponding to FIG. 1 illustrating the seat in a position that it occupies following a rear impact, FIG. 4 is a rear perspective view of the operative parts of the seat, again in the condition that the seat has following a rear impact, FIG. 5 is a view of a recliner mechanism which is a modified embodiment of the invention, FIG. 6 is a view of a recliner mechanism which is a further modified embodiment of the invention, FIG. 7 is a side view of a seat equivalent to FIG. 1 illustrating a further embodiment of the invention, FIG. 8 is an enlarged view of operative parts of the recliner mechanism for the seat of FIG. 7 illustrating the position of the components before a rear impact, FIG. 9 is a view corresponding to FIG. 8 illustrating the position of the components following a rear impact.

Figure 10:
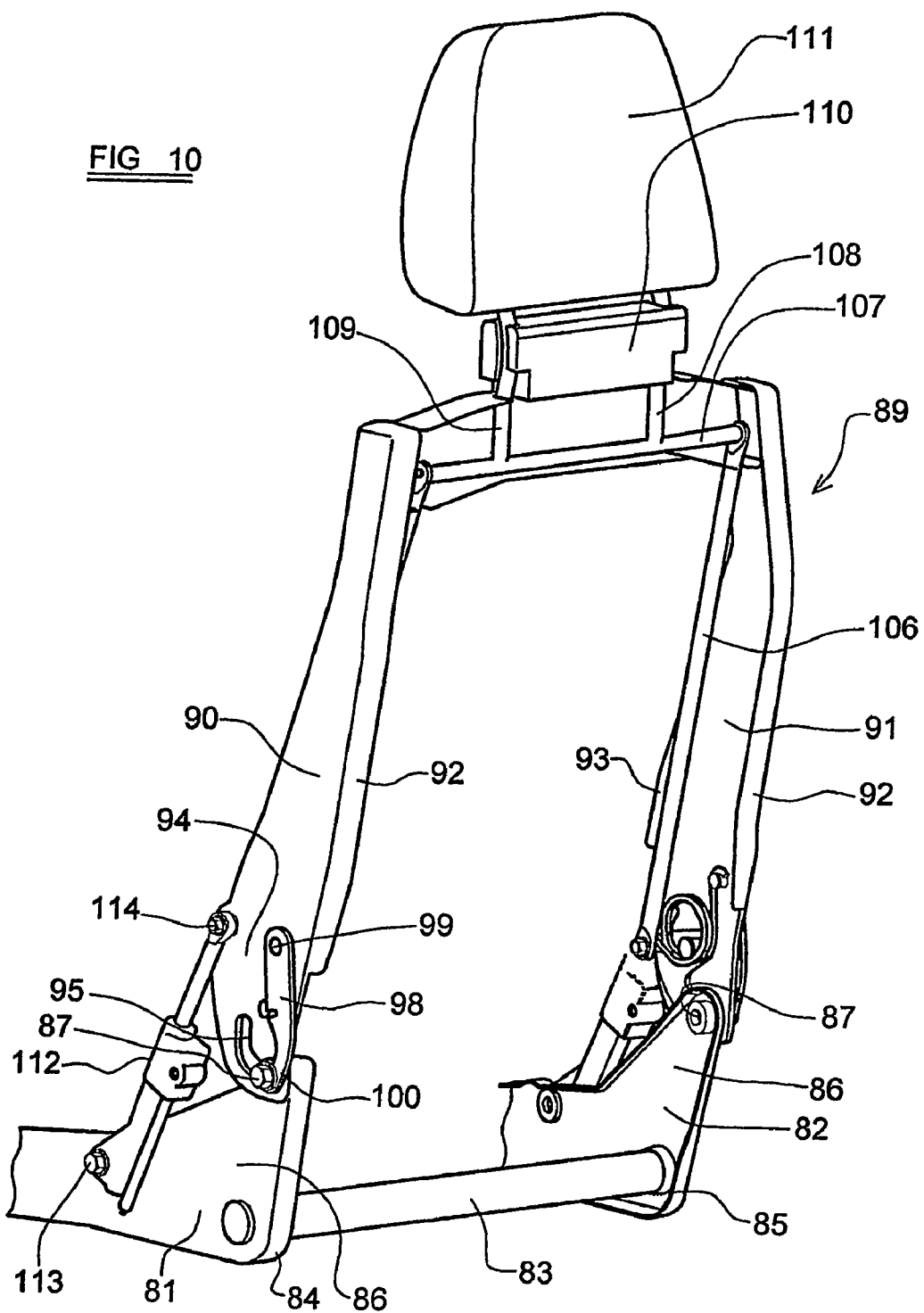
Figure 11:
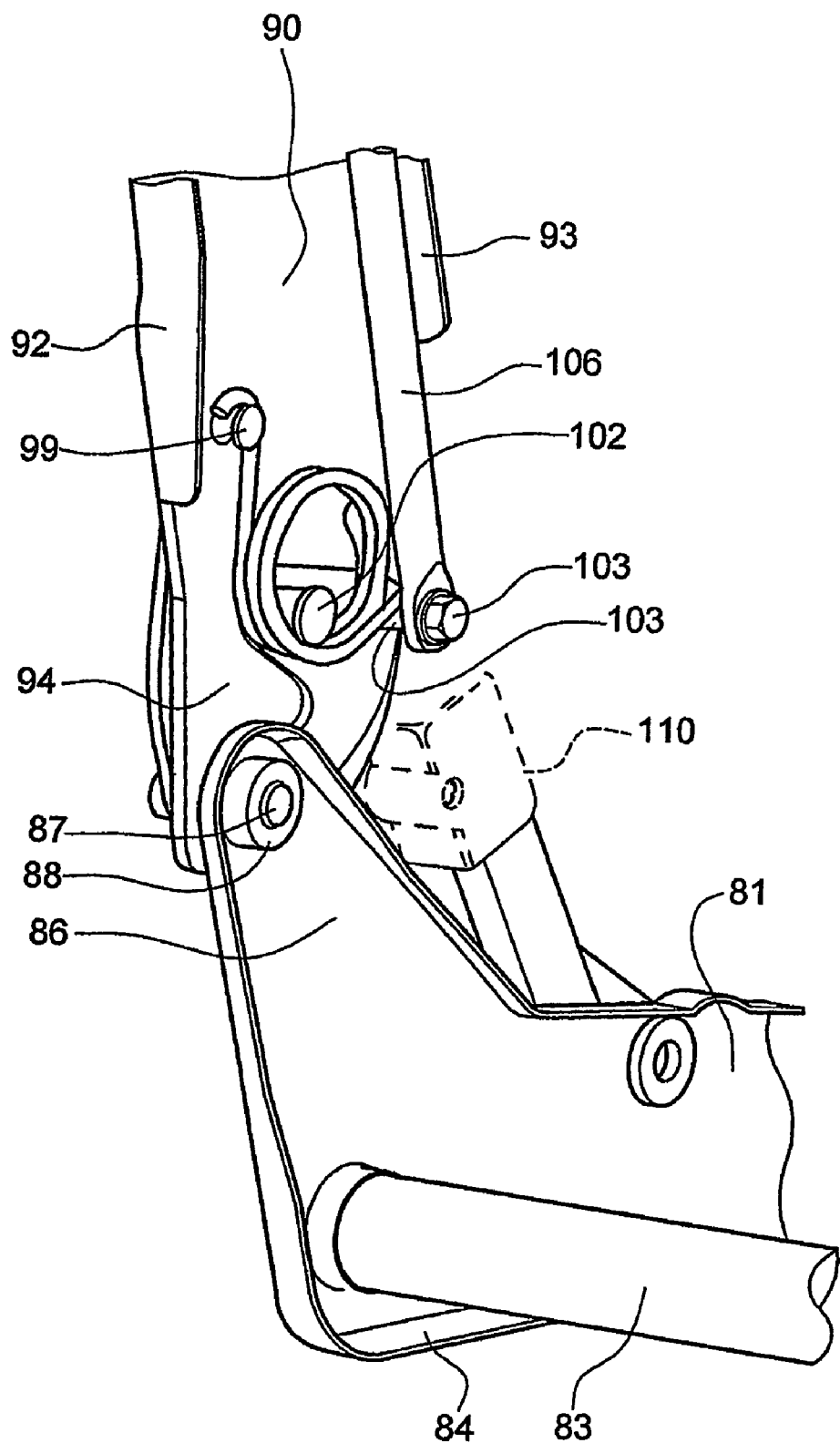

FIG. 10 is a perspective view from the rear and one side of the frame-work of a vehicle seat incorporating a further recliner mechanism in accordance with the invention, FIG. 11 is a perspective view from the rear showing the inside of part of the frame-work shown in FIG. 10, FIG. 12 is a side view of the part of the frame of the vehicle seat of FIGS. 10 and 11 incorporating part of the recliner mechanism taken from the outside of the seat with the seat in its ordinary condition, FIG. 13 is a view corresponding to FIG. 12 showing the same part of the seat taken from the inside of the seat, FIG. 14 is a view corresponding to FIG. 12 illustrating the components during a rear impact situation, FIG. 15 is a view corresponding to FIG. 13 showing the components in the position they occupy in FIG. 14, FIG. 16 is a view corresponding to FIG. 14 illustrating the components at the end of a rear impact situation, and FIG. 17 is a view corresponding to FIG. 15 again illustrating the components at the end of a rear impact situation.

Referring initially to FIG. 1 a vehicle seat 1 comprises a squab 2 and a back-rest 3. The back-rest 3 is provided with a head-rest 4. The seat is to be occupied by a seat occupant 5.

The seat squab 2 incorporates a horizontal frame having a side arm 6. Connected to the side arm 6 at the rear part of the squab is a vertical support plate 7. The support plate 7 is connected to the side arm 6 of the frame by means of bolts 8, 9. The support plate 7 is thus fast with the side arm 6 of the frame of the squab 2. The vertical support plate 7 is of substantially triangular form, having an upwardly directed apex. In the region of the apex the support plate 7 is provided with a horizontally extending pivot shaft 10 (see FIG. 4), the pivot shaft 10 defining an axis about which, in ordinary use, the seat-back 3 may pivot.

A vertical mounting plate 11 is provided which is secured to the back-rest 3, for example by mounting bolts 12, 13. The mounting plate 11 is thus fast with the back-rest 3. The mounting plate 11 is of generally triangular form with a downwardly directed apex. In the region of apex the mounting plate 11 is provided with a groove or slot 14, which is of generally "L"-shaped form. As can be seen most clearly from FIG. 4, the groove or slot 14 is provided with an initial lower-most retaining section 15 which is only inclined slightly from the horizontal, the initial section 15 being connected to a second, somewhat longer elongate section 16, which extends forwardly and upwardly.

At this stage it is to be understood that the shaft 10, which defines the pivot axis about which the seat-back 3 may pivot in ordinary use of the seat-back, is received within the groove or slot 14 and may slide along the groove or slot 14, as the slot is dimensioned to permit such movement of the shaft 10. Initially the pivot shaft 10 is received within the first generally horizontal retaining section 15 of the groove or slot 14. The horizontal retaining section 15 may be straight or may have at least one curved edge to reduce the risk of the pivot shaft 10 becoming jammed or otherwise held in the section 15 by friction.

An energy absorbing deformable element 17, in the form of an elongate deformable arm, is provided, the deformable element having one end retained in position by the mounting bolt 13 that secures the mounting plate 11 to the seat-back, and having the other end mounted on the pivot shaft 10. A retaining spring 18 is also provided, to retain the pivot shaft 10 in the first generally horizontal section 15 of the slot 14. The spring 18 has a portion wound around the bolt 13, in the form of a plurality of helical windings. One end of the spring is held in an aperture 19 provided in the mounting plate 11, and the other end of the spring comprises a relatively long straight arm 20 which directly engages the pivot shaft 10, again as can be seen most clearly in FIG. 4, to provide a biasing force, biasing the pivot shaft 10 into the lower-most section 15 of the groove or slot 14. In a modified embodiment of the invention the energy absorbing element is not a deformable arm, but is a piston-and-cylinder unit, the cylinder having a small outlet and being filled with a material which can be extruded through the small outlet, with energy being absorbed, on movement of the piston relative to the cylinder. Other energy absorbing elements may be used.

A drive mechanism is provided extending between a point on the squab 2 and a point on the seat-back 3 to drive the seat-back forwardly and rearwardly, with a pivotal motion about the pivotal axis defined by the pivot shaft 10 so that the position of the seat-back may be angularly adjusted. In the embodiment of FIGS. 1 to 4 the drive mechanism is in the form of a turn buckle or "rigging screw" mechanism 21 which extends from the bolt 9 which secures the support plate 7 to the side arm 6 of the frame of the squab 2 and the bolt 12 which secures the mounting plate 11 to the back-rest 3 of the seat. The turn buckle or rigging screw may be manually or electro-mechanically operated, so that the effective length of this drive mechanism is adjusted. The turn buckle or rigging screw may, in alternative embodiments, comprise any unit of controllably adjustable length.

Turning now to FIGS. 2 and 4 in particular, the pivot shafts 10 extend inwardly relative to the support plate 7, thus extending part-way across the interior of the back-rest 3 of the seat. Each pivot shaft 10 carries an upwardly directed link arm 22, which extends upwardly towards the top part of the back-rest 3 of the seat. The upper ends of the link arms 22 are interconnected by a horizontal transverse rod 23, which is pivotally connected to the link arms. The transverse rod 23 carries two generally upwardly extending head-rest support arms 24, 25. The head-rest support arms 24, 25 extend through a guide block 26 provided at the top-most part of the back-rest 3 of the seat. The parts of the support arms received in the block are of arcuate form and are received in arcuate guides within the guide block 26.

In ordinary operation of the back-rest, the length of the drive mechanism 21 may be adjusted manually or by an electronic control. As the length of the drive mechanism is increased, the distance between the bolt 9 secured to the squab of the seat and the bolt 12 secured to the back-rest of the seat will increase, and this will cause the back-rest of the seat to pivot about the axis defined by the pivot shafts 10. A reduction of the length of the drive mechanism 21 will cause an opposite movement of the back-rest. Because the pivot shaft 10 is in the retaining section 15 of the slot, the mounting plate 11 cannot move relative to the support plate 7, except in the pivotal sense described above when the drive mechanism 21 is actuated.

Because the drive mechanism is a positive drive connected between two bolts there is a minimum of play and the seat provides a desired sense of firmness and security.

Should a vehicle in which the seat illustrated in FIGS. 1 to 4 is mounted be involved in a rear impact, whilst the seat is occupied by an occupant 5, the inertia of the occupant will cause the buttocks of the occupant to impart a substantial generally rearwardly directed initial force to the lower part of the back-rest of the seat. The force will be such that the lower-most part of the back-rest will move rearwardly, and the spring 18 will be deformed, thus enabling the lower part of the back-rest to move rearwardly slightly, with the deformable member 17 pivoting slightly about the axis of the bolt 13 which secures the upper part of the deformable member 17 to the seat-back 3. The effect of this is to move the pivot shaft 10 along the generally horizontal retaining portion 15 of the slot 14, thus bringing the shaft 10 into alignment with the generally upwardly directed elongate section 16 of the groove or slot 14.

The back-rest 3 may then, in response to a continuing force applied by the torso of the occupant, move in such a way that the bolt 12, which is connected to the upper end of the drive mechanism 21, will execute a rearward arcuate movement about the axis of the bolt 9. Of course, the drive mechanism 21 is, during the few milliseconds of a rear impact situation, of constant length. As the seat-back executes this movement, effectively the seat-back becomes lowered as the pivot shaft 10 effectively moves up the generally vertical section 16 of the groove or slot 14, with a resultant deformation of the energy absorbing deformable element 17. Thus energy is absorbed as the deformable element deforms and also as the spring 18 becomes further deformed.

It is thus to be understood that in a rear impact situation after an initial rearward movement of at least the lower part of the seat-back, during which the spring 18 is deformed to absorb slight amount of energy, the seat-back executes a rearward and downward pivoting motion, during which motion the pivot shaft 10 effectively travels up the vertical elongate part 16 of the slot 14, causing energy to be absorbed by deformation of the deformable element 17 and also by further deformation of the spring 18. The energy absorbed in this second movement of the seat is much greater than the energy absorbed in the initial movement of the seat. Thus the inertial energy of the occupant is gradually absorbed, minimising the risk of injury.

It is to be understood that as the seat-back executes this rearward and downward pivoting motion, the link arms 22 effectively move upwardly within the back-rest of the seat. As the link arms move upwardly, so the transverse rod 23 moves upwardly and the head-rest support arms 24, 25 move upwardly through the mounting block 26. Because the portions of the head-rest-support arms 24, 25 which pass through the mounting block 26 are of arcuate form and pass through arcuate guides, the effect is that the head-rest 4 of the seat moves slightly upwardly and also forwardly with reference to the main part of the back-rest 3 of the seat, thus moving the head-rest 4 to a position in which it is in engagement with, or at least close to, the head of the seat occupant. Thus, during the rear impact situation, the risk of the head of the occupant moving by a substantial distance relative to the torso of the occupant is reduced and consequently also the risk of a whiplash injury is reduced. The link arms 22 and the pivot shaft 10 incorporate a region of mechanical weakness which will yield or deform if the movement of the head-rest is prevented or substantially resisted, for example if the head of the seat occupant is already in firm engagement with the head-rest.

Because the seat-back moves, during a rear impact situation, with two separate movements, namely a first generally rearward movement against a relatively low restraining force, provided by the spring, and secondly with a rearward and downward pivoting movement executed against a much greater restraining force provided by the combination of the spring and the deformable member, in a very low speed rear impact the back of the seat-rest may execute only the first movement, enabling the components of the seat-back to be re-positioned easily without any component being replaced. However, after the seat-back has executed the second movement, it will be necessary for the seat-back to receive specialist attention with the deformable element being replaced before the seat can be reused.

FIG. 5 illustrates a modified embodiment of the invention in which the drive mechanism 21 shown in FIGS. 1 to 4 is replaced by a different drive mechanism 30.

The drive mechanism 30 is provided with a first housing 31 secured by means of the bolt 8 which secures the support plate 7 to the squab of the seat, the housing 31 containing a drive motor which drives a horizontal threaded shaft 32, the threaded shaft 32 extending to a second housing 33 which is secured to the mounting bolt 9 which secures the support plate 7 to the side arm 6 of the frame of the squab 2.

A thread follower 34 is mounted on the threaded shaft 32 and is pivotally connected by means of a pivot 35 to the lower end of a connecting arm 36, the upper end of the connecting arm 36 being secured pivotally to the mounting bolt 12 which secures the mounting plate 11 to the back-rest 3 of the seat.

It is to be understood that as the threaded shaft 32 is rotated the thread follower 34 will be driven along the shaft. As the thread follower is driven towards the right as shown in FIG. 5 the connecting arm 36 will apply generally upwardly directed force to the bolt 12 causing the seat-back to pivot downwardly or rearwardly about the pivot axis defined by the pivot shaft 10 whereas when the threaded shaft 32 is driven in such a way that the thread follower 34 moves towards the left, the connecting arm 36 will move in such a way that the bolt 12 securing the mounting plate 11 to the seat-back 3 moves generally downwardly causing the seat-back to move upwardly or forwardly.

FIG. 6 illustrates a further modified drive mechanism in the form of a drive mechanism 40. The drive mechanism 40 consists of a rotatable vertical plate 41 which is mounted to the support plate 7 for rotation about a horizontal axis, for example by means of a motor (not shown). The plate 41 is provided with a radially protruding lug 42, the lug 42 being connected by means of a pivot pin 43 to the lower end of a connecting arm 44, the upper end of the connecting arm 44 being pivotally connected to the bolt 12 which secures the mounting plate 11 to the back-rest of the seat. It can be seen that by rotating the plate 41 appropriately the mounting arm 44 may move the bolt 12 securing the mounting plate 11 to the back-rest 3 of the seat either upwardly or downwardly causing the back-rest of the seat to pivot rearwardly or forwardly about the axis defined by the pivot shaft 10.

It is thus to be understood that many types of drive mechanism may be used to adjust the angle of inclination of the back-rest of the seat. It is preferred that the drive mechanism is such that the drive is a "positive" drive in both directions, thus enabling the angular adjustment of the back-rest of the seat with a minimum degree of play to give the feel of a solid design to the user of the seat.

FIGS. 7 to 9 illustrate a modified embodiment of the invention.

Referring to FIG. 7, a vehicle seat 51 is illustrated, the seat having a squab 52, a back-rest 53 and a head-rest 54.

The squab of the seat is provided with an internal frame having a side arm 55. A rear part of the side arm 55 extends upwardly to form a support portion, the support portion carrying a horizontally extending pivot shaft 56. The pivot shaft 56 forms an axis about which the seat-back 53 may pivot during ordinary use of the seat. The axis is fixed in position relative to the squab of the seat.

A vertical support plate 57 is provided, the support plate being of generally triangular form. The support plate is provided with an upper apex 58, which is provided with an aperture that receives the pivot shaft 56, a lower apex 59 and a rearwardly directed apex 60. Formed in a central part of the vertical support plate is a substantially "L"-shaped slot 61. The support plate is also provided with a spring-retaining aperture 62.

A vertical mounting plate 63 is provided, the mounting plate being provided, in an upper region thereof, with two bolts 64 to secure the mounting plate to the back-rest of the seat. The mounting plate is thus fast with the back-rest of the seat. The mounting plate 63 is provided with an inclined slot 65, through which the pivot shaft 56 passes.

The mounting plate 63 is additionally provided with a spring-retaining aperture 66 and also with a rearwardly directed lug 67 which is positioned adjacent the rearwardly directed apex 60 of the support plate 57.

A pivotal connecting link 68 is provided, the link 68 having a lower end pivotally mounted by means of a pivot 69 to the rearwardly directed apex of the support plate 57 and having an upper end pivotally connected by means of a pivot 70 to the rearwardly directed lug 67 of the mounting plate 63. The pivotal connecting link 68 interconnects the mounting plate 63 and the support plate 57 so that the mounting plate 63 can move with a pivotal movement relative to the support plate 57.

A deformable energy absorbing element 71, in the form of an elongate arm, is provided, which is of arcuate form. The deformable element is provided with a cut-out 72 formed on the radially inner-most side of the arcuate part of the deformable element. The upper-most end of the deformable element is pivotally mounted on the pivot shaft 56. The lower-most end of the deformable element is pivotally mounted on a retaining shaft 73. The retaining shaft 73 passes through the "L"-shaped slot 61 formed in the support plate 57, and is secured to the mounting plate 63 which is fixed to the back-rest of the seat. The slot 61 defines a short retaining section, which may be straight or curved and an elongate section, which also may be straight or curved. The slot is dimensioned to enable the retaining shaft 73 to slide along the slot. Thus the shaft 73 may be mounted on the mounting plate 63.

The lower-most apex 59 of the support plate 57 is connected, by means of a bolt 74 to one end of an drive mechanism 75. The drive mechanism 75 comprises a housing 76 which is secured by means of a mounting bracket 77 to an appropriate part of the side-frame of a seat squab. The housing 76 contains a gear mechanism which is driven by a motor (not shown). The gear mechanism axially drives a shaft 78 which extends from the housing, the free end of the shaft being connected to the bolt 74. Thus the length of the drive mechanism may be increased or decreased.

Thus the support plate 57 is mounted on the side arm 55 of the frame of the squab of the seat by the engagement of the upper apex 58 and the pivot shaft 56, and by the drive mechanism 75. When the length of the drive mechanism is not being adjusted the support plate 57 is effectively fast with the frame of the squab of the seat.

A link arm 79 is provided which is connected to the pivot shaft and which extends upwardly through the back-rest of the seat, the link arm corresponding to the link arms 22 of the first described embodiment, the link arm thus carrying a head-rest equivalent to the head-rest of the first described embodiment.

A biasing spring 80 is provided, the spring passing through each of the spring-retaining apertures 62 and 66 provided in the support plate 57 and the mounting plate 63 respectively.

In ordinary use of the seat, the length of the drive mechanism may be adjusted, by driving the motor to cause the shaft 78 to be driven out of or into the housing. If the shaft 78 is driven out of the housing the bolt 74 on the support plate 57 is moved rearwardly. The support plate 57 thus moves with a pivoting action about the pivot axis defined by the pivot shaft 56.

The spring 80 serves to bias the lower-most part of the back-rest so that the retaining shaft 73 is retained within a forwardly extending retaining portion of the "L"-shaped slot 61. With the shaft 73 in the retaining portion of the slot the support plate 57 and mounting plate 63 cannot move relative to each other, but the two plates can move pivotally as a single entity about the axis of the pivot shaft 56. Thus the entire seat-back moves pivotally about the pivot axis defined by the pivot shaft 56, with the mounting plate 63 retaining the same initial relative position relative to the support plate 57. Thus, as the lower-most part of the plate 57 is driven rearwardly, by the drive mechanism 75, so the mounting plate, and thus the seat-back, pivot with a generally forward pivoting motion about the pivot axis defined by the pivot shaft 56. Equally, when the drive mechanism operates in the opposite sense the angle of inclination of the seat-back will alter in the opposite sense.

Should a vehicle having a seat provided with a recliner as illustrated in FIG. 8 be involved in a rear impact, whilst the seat is occupied by an occupant 5, the inertia of the occupant will cause the buttocks of the occupant to impart a substantial generally rearwardly directed initial force to the lower part of the back-rest of the seat. The force will be such that the lower-most part of the back-rest will move rearwardly and the spring 80 will be deformed. As the lower-most part of the back-rest moves rearwardly, the shaft 73 will move rearwardly and also the pivotal connection between the upper end of the link arm 68 and the rearwardly directed lug 67 of the mounting plate will move rearwardly.

As the retaining shaft 73 moves rearwardly, the shaft 73 will move relative to the support plate 57 which, during the relatively brief period of time during which the rear impact will occur, will remain stationary. The support plate 57 will remain stationary because the upper apex 58 of the support plate will be retained in position by its engagement with the pivot shaft 56, the pivot shaft 56 being secured in position relative to the squab of the seat, and because the lower-most apex 59 of the support plate 57 will be held by the bolt 74 connected to the drive mechanism 75. The drive mechanism 75 will, of course, have a constant length during the brief period of time taken for a rear impact to occur.

Rearward movement of the pivotal connection 70 between the upper end of the link 68 and the rearwardly directed lug 67 on the mounting plate 63 is accommodated by a pivoting movement of the link 68 about the pivot axis defined by the lower pivot 69 which connects the lower end of the link to the rearwardly directed apex of the vertical support plate 57.

Consequently the shaft 73 is moved in position substantially in alignment with a vertically extending portion of the "L"-shaped slot in the support plate. The mounting plate 63 may now pivot relative to the support plate 57.

Should a subsequent force be applied to the back-rest of the seat, the back-rest may subsequently pivot rearwardly with a consequent deformation of the deformable member 71. The rearward pivoting is effected about the combined pivot axes defined by the pivotal connections 69 and 70 of the link 68. As the back-rest pivots rearwardly, so, effectively, the pivot shaft 56 will move downwardly along the inclined slot 65 provided in the mounting plate 63 and also the shaft 73 will move up the upwardly directed part of the "L"-shaped slot formed in the support plate 57. As the shaft 73 moves upwardly so the deformable member 71 becomes deformed, absorbing energy. The spring 80 is also further deformed. The back-rest will move rearwardly until a terminal-position, as shown in FIG. 9, is achieved. In the terminal position the deformable member has deformed and the cut-out 72 formed on the radially inner-most part of the arcuate deformable element has substantially closed.

During the described pivotal movement of the back-rest, the elongate link arm 77 has effectively been moved downwardly relative to the back-rest of the seat. This is, of course, a movement in the opposite sense to the movement of the corresponding link arm 22 in the embodiment of FIGS. 1 to 4.

However, a "movement reversing" linkage will be provided associated with the link arm 79 so that the effective downward movement of the link arm is converted to an effective upward movement of the head-rest 4.

FIGS. 10 to 17 illustrate a further embodiment of the invention which, operationally, is similar to that of FIGS. 1 to 4 although, in this embodiment, the mounting and support plates are formed integrally with the frames of the squab and back-rest of the seat, to be fast with these frames.

Referring initially to FIGS. 10 and 11, the squab of a seat is provided with a frame which has two parallel side arms 81, 82, the side arms being interconnected by means of a reinforcing bar 83. Each side arm is formed as a vertical plate reinforced with a peripheral flange 84, 85. Towards the rear of the frame the plate forms an upwardly extending generally triangular region 86 which forms a support plate fast with the frame of the squab of the seat. Towards the upper apex of the support plate 86 there is a horizontally extending pivot shaft 87 mounted to the support plate 86 by means of a mounting bush 88.

The back-rest of the seat is provided with a frame 89 having two side arms 90, 91, each in the form of a vertical plate provided with inwardly directed flanges 92, 93. The lower-most part of the side arm 90 constitutes an integrally formed mounting plate 94, which is provided with a generally "L"-shaped slot 95. The slot 95 is formed with an initial lower-most retaining section 96 which is inclined slightly from the horizontal, the initial retaining section being connected to a second, somewhat longer elongate section 97 which extends forwardly and upwardly. The slot 95 is shown more clearly in FIGS. 12, 14 and 16.

At this stage it is to be understood that the pivot shaft 87, which defines the axis about which the seat-back may pivot in ordinary use of the seat, is received within the slot 95 for movement along the slot. Initially the pivot shaft 87 is received within the first generally horizontal retaining section 96 of the slot 95.

An energy absorbing element 98, in the form of an elongate deformable arm 98, is provided. The arm 98 is shown clearly in FIG. 12. The deformable arm 98 is mounted on the exterior surface of the mounting plate 94. One end of the deformable arm is pivotally mounted to the part of the side arm 90 defining the mounting plate 94 by means of a stud 99 which extends through the mounting plate. The other end of the deformable arm 98 is provided with a cylindrical sleeve 100 which extends through the slot 96. The interim of the sleeve 100 is dimensioned to receive within it the pivot shaft 87.

On the interior face of the mounting plate 94, a keeper element 101 is provided, the keeper being in the form of a generally "L"-shaped plate. The keeper element is pivotally mounted, by means of a pivot 102, to the interior face of the mounting plate 94. The pivot 102 is at one end of one arm of the "L"-shaped plate 101. Adjacent the apex of the "L"-shaped keeper plate, the plate is provided with a stud 103. The stud 103 is shown clearly in FIG. 13.

A spring 104 is provided having a central helical portion and two terminal extending arms. One arm engages the inner-most end of the stud 99 on the mounting plate 94, and the other end engages the stud 103 on the keeper plate 101. The spring serves to bias the end of the free arm 105 of "L"-shaped keeper 101 towards the sleeve 100 of the deformable element 98 which extends through the slot 95, so that the keeper plate 101 will retain the sleeve 100 within the retaining section 96 of the slot 95.

The stud 103 on the keeper is connected to an upwardly directed link arm 106 which extends upwardly and is connected to a transverse rod 107 carrying upwardly extending head-rest support arms 108, 109. The head-rest support arms 108, 109 extend through a guide block 110 provided at the top-most part of the back-rest of the seat. The parts of the support arms received in the block are of arcuate form and are received in arcuate guides within the guide block. The arms 108,109 support a headrest 111.

A drive mechanism 112 is provided, corresponding to the drive mechanism 21 of the embodiment of FIGS. 1 to 4, the lower end of the drive mechanism being connected to the side arm 81 of the seat squab by means of a bolt 113 and the upper end of the drive mechanism being connected to the upper-most part of the mounting plate 94 formed integrally with a side arm 90 of the frame by means of a bolt 114. As in the previously described embodiments the length of the drive mechanism may be adjusted manually or by an electronic control.

It is to be appreciated that, since the deformable element 98 is provided with a sleeve 100 which extends through the slot 95, the components that are mounted to the mounting plate, that is to say the deformable element 98, the keeper 101 and the associated spring 104 may all be mounted in position on the mounting plate, with the spring under tension, with the arm 105 of the keeper engaging the sleeve 100, before the frame of the back-rest is mounted pivotally to the frame of the squab of the seat. This facilitates the manufacturing process.

In ordinary operation of the back-rest, the length of the drive mechanism may be adjusted. As the length of the drive mechanism is increased the distance between the bolt 113 secured to the frame of the squab of the seat and the bolt 114 secured to the frame of the back-rest of the seat will increase and this will cause the back-rest of the seat to pivot about the axis defined by the pivot shaft 87. A reduction of the length of the drive mechanism will cause an opposite movement of the back-rest. Because the pivot shaft 87 is located in the retaining section 96 of the slot 95, and is retained in position by the keeper 101 which is urging the sleeve 100 to the closed end of the retaining section 96 of the slot 95 by virtue of the effect of the spring 104, the mounting plate 94 cannot move relative to the support plate 86, except in the pivotal sense described above when the drive mechanism 112 is actuated.

Should a vehicle in which the seat illustrated in FIGS. 10 to 13 is involved in a rear impact, whilst the seat is occupied by an occupant 5, the inertia of the occupant will cause the buttocks of the occupant to impart a substantial generally rearwardly directed initial force to the lower part of the back-rest of the seat. The force may be such that the lower-most part of the back-rest will move rearwardly, and the keeper 101 will move pivotally about the axis of the pivotal mounting 102, and the spring 104 will be deformed, thus enabling the lower part of the back-rest to move rearwardly slightly with the deformable member 98 pivoting slightly about the axis of the stud 99. The effect of this is to move the pivot shaft 87, with the surrounding casing or sleeve 100, along the horizontal retaining portion 96 of the slot 95, thus bringing the combination of the shaft 87 and the sleeve 100 into alignment with the generally upwardly directed elongate section 97 of the slot 95.

As the combination of the pivot shaft 87 and the surrounding sleeve 100 move along the generally horizontal retaining portion 96 of the slot 95, the keeper plate 101 executes a pivotal movement about the axis of the pivotal mounting 102. This causes the stud 103 provided at the apex of the "L"-shaped keeper plate 101 to move arcuately with a generally upward movement. This moves the associated link arm 106 upwardly, causing the head-rest 111 to rise slightly and move forwardly in a manner corresponding to that described with the embodiment of FIGS. 1 to 4. However, it is to be noted that in this embodiment of the invention the head-rest executes this upward and forward movement during the initial phase of the rear impact, that is to say the phase in which the lower-most part of the back-rest moves rearwardly. The head-rest is thus very promptly moved to a position in which it may protect the head of the seat occupant.

In response to a continuing force applied by the torso of the occupant of the back-rest, the back-rest may subsequently move in such a way that the bolt 114, which is connected to the upper end of the drive mechanism 112, will execute a rearward arcuate movement about the axis of the bolt 113 which is connected to the frame of the squab of the seat. Of course, the drive mechanism 112, during the few milliseconds of a rear impact situation, will remain of substantially constant length. As the seat-back executes this movement, effectively the seat-back becomes lowered as the pivot shaft 87 and the surrounding sleeve 100 effectively move up the generally vertically extending section 97 of the slot 95, with a resultant deformation of the energy absorbing deformable element 98. Thus energy is absorbed as the deformable element deforms.

When the combination of pivot shaft 87 and the surrounding sleeve 100 have moved along the retaining section 96 of the slot 95, so as to be in alignment with the substantially vertical section 97 of the slot 95, the generally "L"-shaped keeper plate 101 has been moved to such a position that one side edge of one arm of the keeper plate is almost in alignment with one edge of the substantially vertically extending section 97 of the slot. As the combination of the pivot shaft 87 and the sleeve 100 move up this section of the slot the keeper plate does execute a further slight rotational movement about the pivot axis 102, again further moving the associated link arm 105 upwardly, thus further moving the head-rest. However, in a modified embodiment the keeper plate may be designed so that after the initial movement of the pivot shaft 87 and sleeve 100 along the retaining section 96 of the slot 95, during which the keeper plate 101 moves rotationally, there is no movement of the keeper plate 101 as the pivot shaft 87 and sleeve 100 move along the vertical section 97 of the slot 95.

Thus, in this embodiment, in a rear impact situation, after an initial rearward movement of the lower part of the seat-back, during which the keeper plate 101 moves and the spring 104 becomes deformed to absorb a slight amount of energy, the seat-back executes a rearward and downward pivoting motion, during which motion the pivot shaft 87 effectively travels up the vertical part 97 of the slot 95, causing energy to be absorbed by deformation of the deformable element 98, and also by further deformation of the spring 104. Thus the inertial energy of the occupant is gradually absorbed, minimising the risk of injury. Simultaneously the head-rest is moved to a position which it can provide maximum protection for the seat occupant.

In the described embodiments the springs 18, 80 and 104 which initially retain the shaft 10, 73 or 87 in the retaining part of the slot may be replaced by a frangible element, or may be supplemented by a frangible element. The frangible element will deform, possibly by breaking, when subjected to a predetermined force.

It is thus to be appreciated that all of the described embodiments operate, in extremely similar ways. In each embodiment the back-rest executes an initial rearward movement against a restraining effect provided by a spring. Thus only a relatively low predetermined level of applied force is need to move the back-rest through this initial stage of movement. Subsequently the back-rest may tilt rearwardly with substantial amounts of energy being absorbed by the deformation of a deformable element. During the rearward movement a head-rest may be caused to move forwardly relative to the back-rest.

It is envisaged that if a seat as described above is to be used either as a front seat in a two door vehicle, or as a rear seat in a multi-purpose vehicle, the recliner may incorporate a forward folding facility, which is preferably associated with a quick release mechanism. If the seat is a front seat the forward forwarding facility may enable the seat back to be moved forwardly to provide easy access to the rear seat, whereas, if the seat is a rear seat, the forward folding facility may enable the seat back to move to a horizontal position, with part of the seat back forming part of a load carrying platform.

When used in this Specification and Claims, the terms "comprises" and "comprising" and variations thereof mean that the specified features, steps or integers are included. The terms are not to be interpreted to exclude the presence of other features, steps or components.

The invention claimed is:

1. A recliner mechanism for a vehicle seat in combination with the vehicle seat, comprising:
  a support plate to be carried by a frame of a squab of the seat;
  a mounting plate to be carried by a back-rest of the seat, there being a pivotal interconnection between the support and mounting plates to enable the mounting plate to move with a pivotal action relative to the support plate to enable the back-rest of the seat to be reclined relative to the squab;
  a drive mechanism operable to effect reclining of the back-rest of the seat;
  one of the support and mounting plates defining a slot receiving a shaft, the shaft fixedly carried by the other of the support and mounting plates such that the shaft is mounted for movement with one of the back-rest and the squab, the slot defining two sections in the form of an initial retaining section and a second elongate section, the slot being dimensioned to permit movement of the shaft along the slot;
  a deformable element retaining the shaft within the initial retaining section of the slot to prevent relative movement between the plates, the deformable element being deformable when subjected to a predetermined force to permit the shaft to move from the initial retaining section of the slot to the elongate section, to enable the shaft subsequently to move along the elongate section, to permit relative movement between the plates, with the back-rest moving rearwardly relative to the squab; and
  an energy absorbing element to absorb energy as the shaft moves along the elongate section of the slot;
  wherein the mounting plate is fast with the frame of the back-rest and the support plate is mounted to the frame of the squab for movement relative to a seat squab frame, the support plate being mounted by engagement with the shaft, which is carried by the squab of the seat, and by the drive mechanism, the drive mechanism secured to the frame of the squab of the seat, the slot being formed in the support plate, a retaining shaft which is fast with the mounting plate extending through the slot, the energy absorbing element engaging the main pivot shaft and the retaining shaft, the support plate and the mounting plate being pivotally interconnected by a pivot linkage, the shaft defining the axis of pivotal movement of the mounting plate and the support plate as the back-rest of the seat is reclined.

2. The recliner mechanism in combination with the vehicle seat of claim 1, wherein the deformable element absorbs a predetermined amount of energy when subjected to the predetermined force to permit the shaft to move from the initial retaining section of the slot to the elongate section, the energy absorbing element being configured to absorb a substantially greater amount of energy during the subsequent rearward movement of the back-rest.

3. The recliner mechanism in combination with the vehicle seat of claim 1, wherein the energy absorbing element is in the form of a deformable arm.

4. The recliner mechanism in combination with the vehicle seat of claim 1, wherein the energy absorbing element is provided with a tubular casing extending through said slot, the shaft which is received in the slot being accommodated within the tubular casing.

5. The recliner mechanism in combination with the vehicle seat of claim 1, wherein the energy absorbing element is connected to the mounting plate and also connected to the shaft.

6. The recliner mechanism in combination with the vehicle seat of claim 1, wherein the deformable element is in the form of a spring, the spring operating to bias the shaft into the initial retaining section of the slot.

7. The recliner mechanism in combination with the vehicle seat of claim 6, wherein the spring acts directly on the shaft.

8. The recliner mechanism in combination with the vehicle seat of claim 6, wherein the spring acts on the pivot shaft through a pivotally mounted keeper.

9. The recliner mechanism in combination with the vehicle seat of claim 1, wherein the drive mechanism is operable to increase or decrease a distance between a point on the support plate and a fixing on the mounting plate.

10. The recliner mechanism in combination with the vehicle seat of claim 1, wherein the deformable element is in the form of a spring, the spring engaging the support plate and the mounting plate and biasing the support plate and the mounting plate to a position in which the retaining shaft is located in the initial retaining section of the slot.

11. The recliner mechanism in combination with the vehicle seat of claim 1, in combination with a head-rest moving mechanism to move the head-rest of the seat in response to a movement of the mounting plate relative to the support plate sufficient to result in at least one of deformation of the deformable element and energy absorption by the energy absorbing element.

12. The recliner mechanism in combination with the vehicle seat of claim 11, wherein a link arm links the recliner mechanism with the head-rest, the link arm being connected to the shaft.

13. The recliner mechanism in combination with the vehicle seat of claim 11, wherein a link arm connects the recliner mechanism with the head-rest, the link arm being connected to the retaining shaft.

14. The recliner mechanism in combination with the vehicle seat of claim 11, wherein the seat is provided with two recliner mechanisms, one on each side of the seat, each recliner mechanism being connected to a respective link arm, movement of the link arms causing movement of head-rest supports to cause the head-rest to move forwardly.

15. The recliner mechanism in combination with the vehicle Seat of claim 14, wherein the head-rest supports are arcuate and extend through arcuate guides in a guide block so that axial movement of the supports causes the head-rest to move upwardly and forwardly relative to the back-rest of the seat.

16. The recliner mechanism in combination with the vehicle seat of claim 1, wherein the deformable element is a resilient element.

17. The recliner mechanism of claim 1, further comprising a linear drive mechanism operable to effect reclining of the back-rest of the seat, the linear drive mechanism interconnecting the back-rest and the squab and having an adjustable length, wherein the back-rest and the squab pivot relative to one another about the shaft when the length is adjusted.

18. A recliner mechanism for a vehicle seat, the recliner mechanism comprising:
  a support plate carried by a frame of a squab of the seat;
  a mounting plate carried by a back-rest of the seat, there being a pivotal interconnection between the support and mounting plates to enable the mounting plate to move with a pivotal action relative to the support plate to enable the back-rest of the seat to be reclined, relative to the squab;
  a drive mechanism operable to effect reclining of the back-rest of the seat;
  one of the support and mounting plates defining a slot receiving a shaft fixedly carried by the other of the support and mounting plates such that the shaft is fixedly carried by one of the back-rest and the squab, the slot defining two sections in the form of an initial retaining section and a second elongate section, the slot being dimensioned to permit movement of the shaft along the slot; and
  a deformable element to retain the components of the recliner in such a position that the shaft is retained within the initial retaining section of the slot to prevent relative movement between the plates, the deformable element being deformable when subjected to a predetermined force to permit the shaft to move from the initial retaining section of the slot to the elongate section, to enable the shaft subsequently to move along the elongate section, to permit relative movement between the plates, with the back-rest moving rearwardly relative to the squab, there being an energy absorbing element to absorb energy as the shaft moves along the elongate section of the slot in the form of a deformable arm;
  wherein the recliner mechanism is associated with a head-rest moving mechanism to move the head-rest of the seat in response to a movement of the mounting plate relative to the support plate sufficient to cause at least one of deformation of the deformable element and energy absorption by the energy absorbing element.

19. The recliner mechanism of claim 18, a linear drive mechanism operable to effect reclining of the back-rest of the seat, the linear drive mechanism interconnecting the back-rest and the squab and having an adjustable length, wherein the back-rest and the squab pivot relative to one another about the shaft when the length is adjusted.

20. A recliner mechanism for a vehicle seat, the recliner mechanism comprising:
  a support plate carried by a frame of a squab of the seat;
  a mounting plate carried by a back-rest of the seat, there being a pivotal interconnection between the support and mounting plates to enable the mounting plate to move with a pivotal action relative to the support plate to enable the back-rest of the seat to be reclined, relative to the squab;
  a linear drive mechanism operable to effect reclining of the back-rest of the seat, the linear drive mechanism interconnecting the back-rest and the squab and having an adjustable length, wherein the back-rest and the squab pivot relative to one another about the shaft when the length is adjusted;
  one of the support and mounting plates defining a slot receiving a shaft which is fast with the other plate, the slot defining two sections in the form of an initial retaining section and a second elongate section, the slot being dimensioned to permit movement of the shaft along the slot; and
  a deformable element to retain the components of the recliner in such a position that the shaft is retained within the initial retaining section of the slot to prevent relative movement between the plates, the deformable element being deformable when subjected to a predetermined force to permit the shaft to move from the initial retaining section of the slot to the elongate section, to enable the shaft subsequently to move along the elongate section, to permit relative movement between the plates, with the back-rest moving rearwardly relative to the squab, there being an energy absorbing element to absorb energy as the shaft moves along the elongate section of the slot in the form of a deformable arm; and
  wherein the recliner mechanism is associated with a head-rest moving mechanism to move the head-rest of the seat in response to a movement of the mounting plate relative to the support plate sufficient to cause at least one of deformation of the deformable element and energy absorption by the energy absorbing element.

* * * * *